United States Patent
Stephens

(10) Patent No.: US 8,992,126 B2
(45) Date of Patent: Mar. 31, 2015

(54) METHOD OF ESTIMATING THE ENVIRONMENTAL FORCE ACTING ON A SUPPORTED JACK-UP VESSEL

(75) Inventor: Richard Ian Stephens, Warwickshire (GB)

(73) Assignee: GE Energy Power Conversion Technology Ltd., Warwickshire (GB)

( * ) Notice: Subject to any disclaimer, the term of this patent is extended or adjusted under 35 U.S.C. 154(b) by 0 days.

(21) Appl. No.: 13/881,563

(22) PCT Filed: Oct. 25, 2011

(86) PCT No.: PCT/EP2011/068659
§ 371 (c)(1),
(2), (4) Date: Jun. 12, 2013

(87) PCT Pub. No.: WO2012/055867
PCT Pub. Date: May 3, 2012

(65) Prior Publication Data
US 2014/0147216 A1    May 29, 2014

(30) Foreign Application Priority Data
Oct. 27, 2010   (EP) .................................. 10014021

(51) Int. Cl.
*E02B 17/02* (2006.01)
*G01L 5/00* (2006.01)
*B63H 23/24* (2006.01)
*B63H 25/42* (2006.01)

(52) U.S. Cl.
CPC . *E02B 17/02* (2013.01); *G01L 5/00* (2013.01); *B63H 23/24* (2013.01); *B63H 25/42* (2013.01); *E02B 17/021* (2013.01)
USPC .......................................... 405/196; 405/203

(58) Field of Classification Search
USPC ................... 405/196, 203, 205, 224
See application file for complete search history.

(56) References Cited

U.S. PATENT DOCUMENTS

| | | | | | |
|---|---|---|---|---|---|
| 3,171,259 | A | * | 3/1965 | Roussel | 405/199 |
| 3,592,013 | A | * | 7/1971 | Pogonowski | 405/201 |
| 4,482,272 | A | * | 11/1984 | Colin | 405/198 |
| 4,881,852 | A | * | 11/1989 | Gunderson | 405/224 |
| 6,932,542 | B2 | * | 8/2005 | Chianis et al. | 405/223.1 |
| 7,261,164 | B2 | * | 8/2007 | Hollier | 166/356 |
| 7,380,513 | B2 | * | 6/2008 | Lie | 114/244 |
| 8,708,052 | B2 | * | 4/2014 | Radi | 166/350 |
| 8,713,891 | B2 | * | 5/2014 | Carr et al. | 52/745.17 |
| 8,733,447 | B2 | * | 5/2014 | Mouton et al. | 166/355 |
| 2005/0013666 | A1 | * | 1/2005 | Chianis et al. | 405/203 |
| 2005/0080522 | A1 | | 4/2005 | Hamamatsu | |
| 2005/0100414 | A1 | * | 5/2005 | Salama | 405/224.2 |
| 2008/0237175 | A1 | * | 10/2008 | Altman et al. | 212/348 |
| 2012/0213593 | A1 | * | 8/2012 | Vandenbulcke et al. | 405/227 |

* cited by examiner

*Primary Examiner* — Benjamin Fiorello
(74) *Attorney, Agent, or Firm* — Parks Wood LLC

(57) ABSTRACT

A method of estimating the environmental force acting on a supported jack-up vessel is described. The vessel is positioned in a force determination position and the strain on at least one support leg of the jack-up vessel is measured while a first thrust is applied to the vessel. A second thrust is applied to the vessel while the vessel is maintained in the force determination position. The variation in the strain in the at least one support leg is monitored as the second thrust is applied and the strain is used to calculate an estimate of the environmental force acting on the vessel. The method allows a dynamic positioning (DP) system of the jack-up vessel to determine a suitable thrust to apply to the vessel as the support legs of the vessel are raised. By applying this suitable thrust the position of the vessel can be maintained when the vessel transitions from being supported by the support legs to being supported by water.

14 Claims, 2 Drawing Sheets

METHOD OF ESTIMATING THE ENVIRONMENTAL FORCE ACTING ON A SUPPORTED JACK-UP VESSEL

FIELD OF THE INVENTION

The invention relates to the determination of the environmental forces acting on a supported jack-up vessel for use by a dynamic positioning (DP) system.

BACKGROUND OF THE INVENTION

It is often necessary to maintain the position of a marine vessel. This can be done using the vessel's thrusters. Dynamic positioning systems are used to control the thrusters to apply thrust to the vessel. More particularly, the thrusters are controlled to apply thrust of the correct magnitude and in the correct direction in order to maintain the position and orientation of the vessel. In order to calculate the required thrust, it is necessary for dynamic positioning systems to measure or estimate environmental forces acting upon a vessel. In a conventional dynamic positioning system, estimates of environmental forces are made from the measurements made using position reference sensors, wind sensors, motion sensors, gyro compasses and other similar means.

Typically, a dynamic positioning system will control the position and orientation of a vessel with respect to surge, sway and yaw or heading. As will be readily understood, the environmental force acting on a vessel with respect to the surge and sway of the vessel will be linear forces whilst the environmental force acting on a vessel with respect to the heading or yaw of the vessel will be a turning moment. For the purposes of this specification it is to be understood that the environmental forces acting on a vessel in the following description include linear forces acting on a vessel with respect to the surge and sway of the vessel and a turning moment acting on the vessel with respect to the heading or yaw of the vessel. However, as will be readily understood by a person skilled in the art, the description is not limited to these degrees of freedom of a vessel and may be relevant to any of the six degrees of freedom of a vessel.

Jack-up vessels are vessels that have a plurality of long support legs that can be vertically lowered or raised. When the support legs are raised jack-up vessels can operate as marine vessels in a substantially normal manner. When the support legs are lowered jack-up vessels can be raised from the sea bed and supported out of the water on the support legs and thereby form secure platforms for operations. Jack-up vessels are of particular use for the installation and maintenance of offshore wind turbines and other similar offshore structures.

Before and after operations, when jack-up vessels are unsupported by the support legs, dynamic positioning systems are often used to move jack-up vessels into and out of position. However, during operations the main body of a jack-up vessel is raised out of the water and the vessel is supported on the sea-bed by the support legs. In this position the jack-up vessel will be substantially stationary. Being raised out of the water makes it impossible for a dynamic positioning system to estimate the environmental forces in a conventional manner. Thus when the operations are completed and the vessel is being lowered back into the water before the vessel transitions from being supported by the support legs to being floating in the water the dynamic positioning system will not be able to calculate the environmental forces acting on the vessel. Without knowing the environmental forces acting on the vessel the dynamic positioning system will be incapable of determining an appropriate thrust to apply to the vessel when the support legs are raised and no longer support the vessel. This can result in a vessel undergoing significant positional excursions due to the environmental forces acting on the vessel before it is possible for the dynamic positioning system to accurately estimate the environmental force and thereby control the thrusters to apply an appropriate thrust to the vessel. In this situation previous measurements of environmental forces are not suitable for use as it is almost inevitable that environmental conditions will not be completely unchanged from when the vessel was raised out of the water.

In light of the above, there is a need for a method of estimating the environmental forces acting on a supported jack-up vessel before the vessel transitions from being supported by the support legs to floating on the water in which it is situated.

SUMMARY OF THE INVENTION

The present invention provides a method of estimating environmental force acting on a supported jack-up vessel comprising the steps of: positioning the vessel in a force determination position; measuring the strain on at least one support leg of the jack-up vessel when a first thrust is being applied to the vessel; applying a second thrust to the vessel; monitoring the variation in the strain in the at least one support leg as the thrust is varied; and calculating an estimate of at least one environmental force from the measured strain in the at least one support leg and the monitored variation in the strain in the at least one support leg as the thrust is varied whilst the vessel is in the force determination position.

As used herein, the 'force determination position' of the method of the present invention is a position in which the vessel is supported by the support legs, the hull of the vessel is positioned in the water and the vessel is a small distance above its final draught. The vessel's final draught is the position the vessel takes in the water when the vessel is completely floating in the water and is unsupported by the support legs. Importantly, in the force determination position the environmental forces acting on the vessel should be substantially the same as the environmental forces that will act on the vessel when it is in its final draught. In the force determination position, the vessel's thrusters will be located in the water.

The precise distance of the force determination position of a vessel above the final draught will be dependent upon the individual vessel to which the method of the present invention is applied. However, an exemplary force determination position of a vessel may be between 0.5 m and 2 m above its final draught. In a particular embodiment of the present invention the force determination position may be approximately 1 m above a vessel's final draught.

The method of the present invention may operate in the following manner. After a jack-up vessel has finished its operations it will be lowered back downwards towards its final draught. When the vessel is in the force determination position a first thrust is applied to the vessel (the first thrust may be any known constant thrust, including but not limited to zero thrust). An estimate of the forces from the support legs is then calculated from the strain measured in the at least one jack-up leg. The force from the support legs along or about any of the axes of the vessel may be estimated. Generally, for a conventional dynamic positioning system, the forces from the support legs with respect to the surge and sway of the vessel and with respect to the heading or yaw of the vessel will be estimated. The thruster(s) of the vessel are then controlled to apply a second thrust to the vessel, the second thrust being different to the first thrust. The variation in the strain in the at least one support leg is monitored as the thrust is varied.

When the vessel is in the force determination position, the environmental forces acting on the vessel are substantially the same as when the vessel is in its final draught. Therefore, forces from the support legs that can be estimated from the measured strain will be substantially equal to the difference between the environmental forces that will act on the vessel when the vessel is in its final draught and the support legs are raised and the known thrust applied to the vessel by the thrusters. That is, the estimated forces from the support legs should be substantially equal to the environmental forces acting on the vessel minus the thrust applied to the vessel.

Although these estimated forces are an initial estimate of the environmental forces acting on the jack-up vessel this estimate would be inaccurate if calculated when a single constant thrust is applied. Therefore, the method of the present invention not only comprises the step of measuring the strain in the at least one support leg when a first thrust is being applied to the vessel but also comprises the steps of applying a second thrust to the vessel and monitoring the variation in the strain in the at least one support leg as the thrust is varied.

The method of the present invention comprises these additional steps in order to provide an improved estimate of the environmental force acting on the vessel. In particular, the calculated forces from the support legs are liable to errors, for example drift, offset and scaling errors. Therefore, by monitoring the variation in the strain of the at least one support leg as the applied thrust is varied it is possible to make a better estimate of the environmental forces acting on the vessel. In particular, varying the thrust applied to the vessel will result in a known change to the forces acting on the vessel. By monitoring the variation in the strain in the at least one support leg as the thrust is varied it is possible to calculate the variation in the calculated forces from the support legs as the thrust is varied. If the environmental forces acting on the vessel are presumed to be constant during this period, this allows the approximate relationship between the estimated forces from the support legs and the actual forces from the support legs to be determined. Knowing this relationship allows a more accurate estimate of the environmental force acting on the vessel to be made.

The relationship between the actual forces from the support legs and the estimated forces from the support legs may comprise offset and scaling errors. Alternatively, there may a different relationship between the actual and estimated forces, for example a polynomial relationship. The actual relationship can be calculated from the monitored strain and the applied thrust in any manner apparent to a person skilled in the art. For example, high order polynomial algorithms or neural network algorithms may be used to determine the relationship. The calculation of the relationship will be carried out along or about each relevant axis of the vessel as controlled by a dynamic positioning system of the vessel. These calculations can be done separately and/or concurrently.

In one embodiment of the invention, at least one scaling factor relating the actual forces from the support legs and the estimated forces from the support legs may be calculated using the method set out immediately above. A separate scaling factor may be calculated for the force acting along or about each relevant axis of the vessel.

In order to improve the accuracy of the estimate of the environmental forces acting on the vessel, it is preferable that the second thrust applied to the vessel whilst the vessel is in the force determination position is varied in magnitude and/or direction. As will be readily appreciated, varying the second thrust that is applied to the vessel as the strain in the at least one support leg is monitored will enable the correlation between the estimated forces from the support legs and the actual forces from the support legs to be more accurately determined than if a second thrust of a single magnitude and direction is applied to the vessel. Additionally, this may allow the relationship between the calculated forces from the support legs and the actual forces from the support legs to be calculated accurately along or about all relevant axes of the jack-up vessel.

The second thrust that is applied to the vessel may be varied in direction and in force in any pattern. The second thrust may be applied in a predetermined pattern or in a random direction or in any other pattern. Preferably the second thrust should be applied to the vessel such that it varies the force applied to the vessel along or about all relevant axes of the vessel (for example the surge, sway and the yaw or heading of the vessel). The relevant axes being dependent upon which directions of the vessel any dynamic positioning system of the vessel controls.

If the second thrust applied to the vessel is varied and this is used to calculate at least one scaling error between the estimated forces from the support legs and the actual force from the support legs it may be preferable that the at least one scaling error is calculated using a regression algorithm. However, it is to be appreciated that any suitable algorithm could be used to calculate the at least one scaling error. If a regression algorithm is used it may be preferable that a least squares regression algorithm is used. A regression algorithm, e.g. a least squares regression algorithm, could be used to calculate any other relationship between the actual and estimated forces from the support legs.

In addition to the steps set out above it may be preferable that a method according to the present invention further comprises the initial steps of: raising the vessel from an unsupported position wherein the vessel is not supported by the support legs to a position where the vessel is supported by the support legs; monitoring applied thrust and the strain in the at least one leg as the vessel transitions from not being supported by the support legs to being supported by the support legs; and determining at least one offset error from the monitored applied thrust and strain.

As discussed above, the estimated forces from the support legs, as determined from the strain measured in the at least one support leg, may not be a completely accurate measurement of the actual forces from the support legs. In particular, the calculated forces from the support legs may be liable to offset errors wherein the calculated forces from the support legs differs from the actual forces from the support legs by an offset amount (which may or may not be in addition to a scaling error and/or any other relationship).

Any offset error may be determined in accordance with the method set out above in the following manner. When the vessel is not supported by the support legs but is floating in the water in which it is located the dynamic positioning system of the vessel will apply thrust to maintain the position of the vessel. When the vessel's position is being maintained the environmental forces acting on the vessel will be equal and opposite to the thrust being applied to the vessel. Therefore, at this point an accurate estimate of the environmental forces acting on the vessel along or about each relevant axis is known. When the vessel transitions to being supported by its support legs the forces from the support legs will be additional forces acting on the vessel. During this period the thrust being applied to the vessel may be reduced to zero. It may be assumed that the environmental forces acting on the vessel remain constant during the transition period. When the vessel is supported by the support legs calculated forces from the support legs can be estimated from the strain measured on the at least one support leg. This can be done in any manner apparent to a person skilled in the art. By resolving the applied thrust and the environmental forces acting on the vessel the predicted forces from the support legs can be calculated. Again, this can be done in any manner apparent to a person skilled in the art. The difference between the predicted forces from the support legs and the calculated forces from the support legs can be considered to be an offset error of the calculated forces from the support legs. This calculation can be performed separately along or about each relevant axis of the vessel.

It is noted that the offset errors may be calculated either whilst the thrust being applied to the vessel is held constant or whilst the thrust being applied to the vessel is varied, for example as the thrust applied to the vessel is reduced to zero.

The method of the present invention may work if strain is measured in only one of the support legs of a jack-up vessel. However, it is preferable that strain is measured in a plurality of support legs of the jack-up vessel. Even more preferably, strain will be measured in all of the support legs of the jack-up vessel. As will be readily appreciated, measuring the strain in all of the legs of a jack-up vessel allows a more accurate estimate of the forces from the support legs to be calculated.

Preferably, the strain in the at least one support leg will be measured by means of a plurality of strain gauges installed on the at least one support leg. However, the method of the present invention may utilise any other suitable method of determining the strain in the at least one support leg.

Advantageously, a plurality of strain gauges installed on the at least one support leg will comprise a plurality of subsea gauges that are installed at positions on the at least one support leg that are underwater when the vessel is in the force determination position. Additionally or alternatively, it may be preferable that a plurality of strain gauges comprises a plurality of surface gauges installed at positions on the at least one support leg that are above water when the vessel is in the force determination position.

In order to accurately determine the strain in the at least one support leg it may be preferable that the strain gauges are located on chord and/or diagonal brace members of the at least one support leg. Locating the strain gauges on chord and/or diagonal brace members may provide the best measure of axial load on the at least one support leg.

If the strain in the at least one support leg is measured using a plurality of strain gauges it is important that the strain gauges are located such that they are not damaged when the support legs are raised and lowered through the jack-up vessel.

A particular method of measuring the strain in the legs of a jack-up vessel is disclosed in an Offshore Technology Report published by the Health and Safety Executive entitled "North Sea Jack-Up Measurements on Maersk Guardian" by J. N. Brekke (Brekke). The method of measuring the strain disclosed in this document is suitable for application to the method of the present invention. However, it is to be appreciated that the method disclosed in Brekke may be altered in any suitable manner that is apparent to the person skilled in the art in order to apply the method to a jack-up vessel that is different from the vessel disclosed in Brekke.

The present invention also provides a method of maintaining the position of a jack-up vessel as it transitions from being supported by its support legs to being unsupported by its support legs comprising the steps of: using the method of the present invention to estimate at least one environmental force acting on the supported jack-up vessel; applying a suitable thrust to the vessel on the basis of the estimated at least one environmental force in order to maintain the position and orientation of the vessel when the legs of the jack-up vessel are raised; and fully raising the legs of the jack-up vessel.

By utilising this method the skilled person may be able to better maintain the position of a jack-up vessel as it transitions from being supported by its support legs to being unsupported by its support legs than was previously possible. The method is particularly useful when the environmental forces acting on a vessel are relatively large or subject to large variations over time.

A preferred embodiment of the method of estimating environmental force acting on a supported jack-up vessel according to the present invention will now be described.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
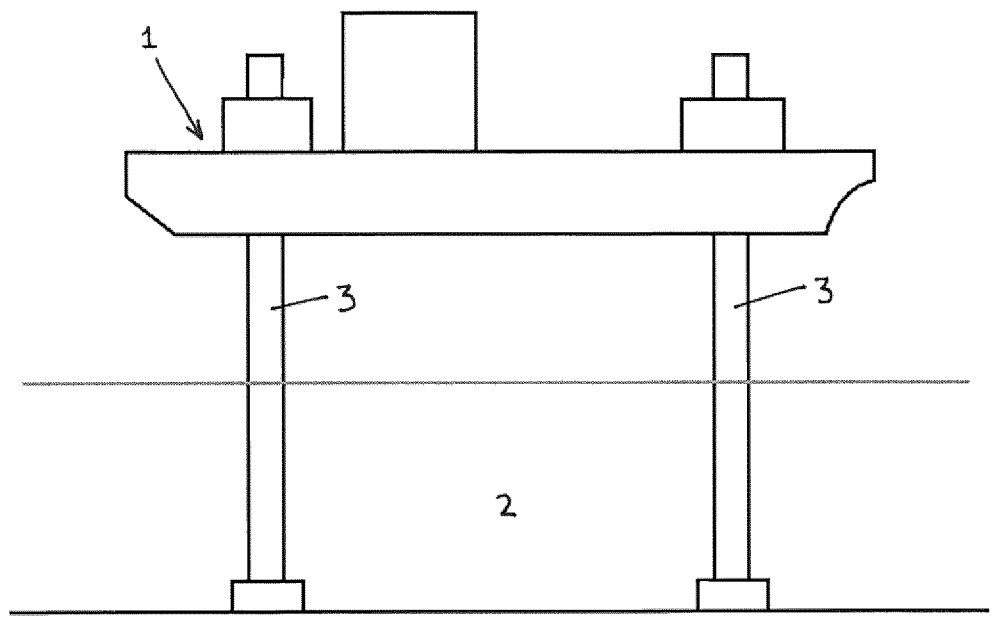
FIG. 1 shows a jack-up vessel in a position where the vessel is fully raised out of the water and is supported by the support legs.
Figure 2:
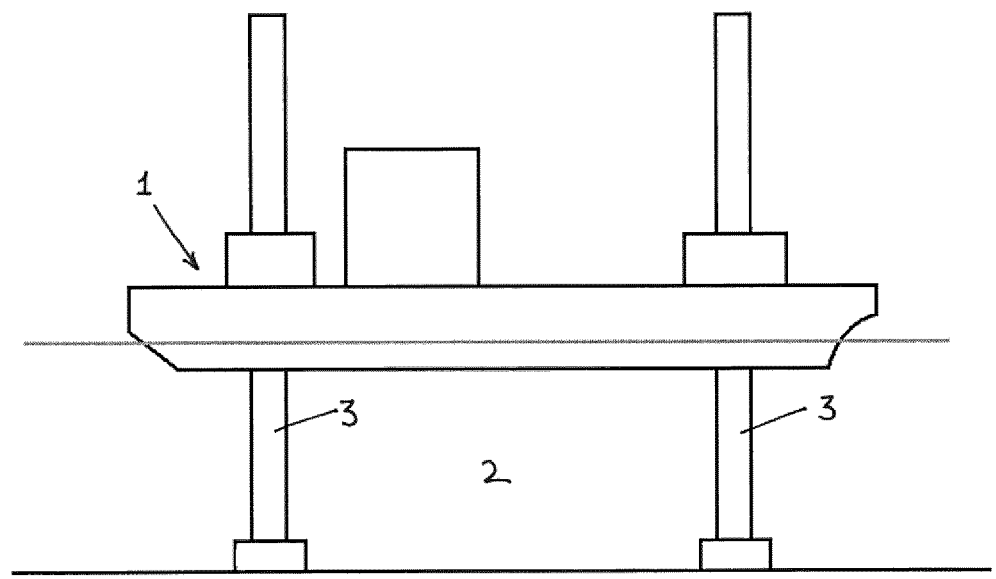
FIG. 2 shows the jack-up vessel of FIG. 1 in a force determination position according to the method of the present invention.
Figure 3:
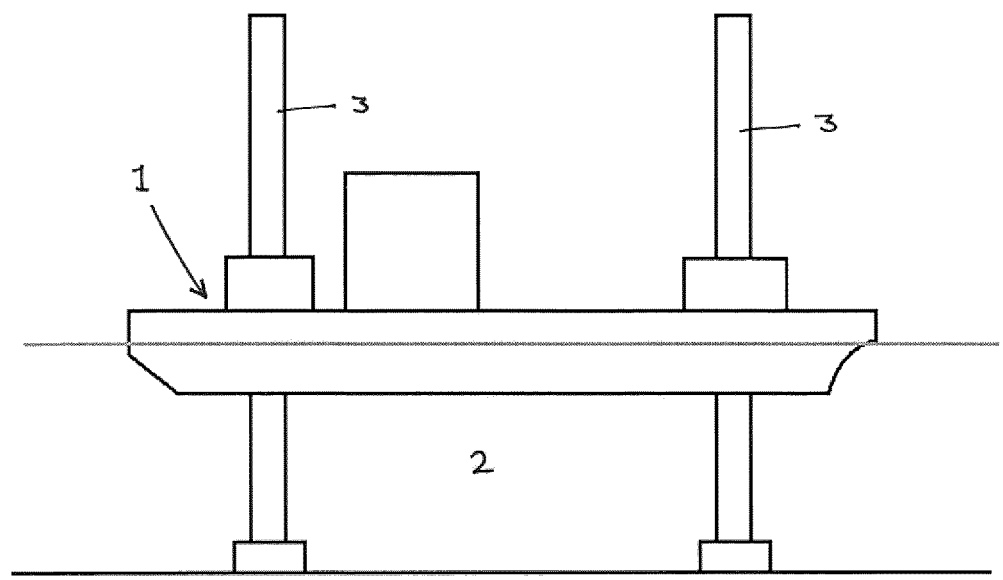
FIG. 3 shows the jack-up vessel of FIGS. 1 and 2 in a position where the vessel is fully supported by the water and with its support legs in contact with the ground.
Figure 4:
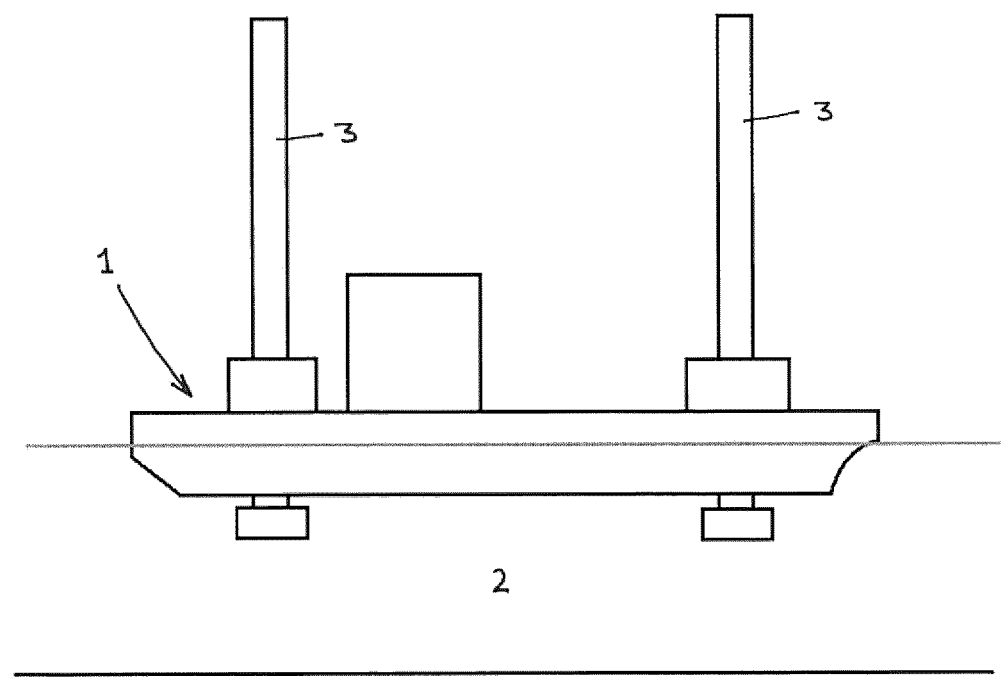
FIG. 4 shows the jack-up vessel of FIGS. 1 to 4 in a position where the vessel is in a final draught position wherein the vessel is fully supported by the water and the support legs are raised.

The operation of a jack-up vessel 1 in a body of water 2 is shown in FIGS. 1 to 4. The jack-up vessel has a plurality of support legs 3 that can be moved to or from a lowered position, wherein they fully support the vessel and the vessel is positioned completely out of the water (as shown in FIG. 1), from or to a raised position, wherein the vessel is fully supported by the water and the support legs are maintained above the bottom of the body of water (as shown in FIG. 4). The jack-up vessel 1 can provide a stable platform for off-shore construction when in the position shown in FIG. 1 and can be easily moved between construction locations in the same manner as a normal vessel when in the position shown in FIG. 4.

The method of the preferred embodiment operates in the following manner. When the vessel 1 is supported by the water in which it is located 2 and the support legs 3 are raised, as shown in FIG. 4, a conventional dynamic positioning system is used to control the thrusters of the vessel to control the vessel's position. In particular, the dynamic positioning system will control the vessel 1 in three axes: surge, sway and heading. Each of these axes is controlled by a separate controller.

When the vessel 1 is supported on the support legs 3 but still positioned in the water, as shown in FIG. 2 or FIG. 3, the vessel will be stationary so no overall force will be acting on the vessel. In particular, the following equation will be true for each relevant degree of freedom of a vessel 1 e.g. surge, sway or heading (it will be only understood that only a single degree of freedom will be considered in the following description but the description is equally valid for any degree of freedom of a vessel):

$$F_t + F_e + F_l = 0$$

Where $F_t$ is a linear force from the thrusters in the case of surge or sway or a turning moment from the thrusters in the case of the heading or yaw of a vessel, $F_e$ is the environmental force along or about the relevant axis and $F_l$ is the true force along or about the relevant axis from the support legs 3 of the vessel 1.

The strain on each of the support legs 3 of the vessel 1 is measured using a plurality of subsea strain gauges (not shown) and a plurality of surface strain gauges (not shown) mounted on the chord and diagonal brace members of each support leg in the manner disclosed in Brekke. The force from the support legs 3 in the relevant degree of freedom (e.g. surge, sway or heading) is estimated from the measurements of the strain gauges in a conventional manner. However, this estimated force will be liable to offset and scaling errors. Therefore, the estimated force from the support legs 3 is considered to be related to the true force from the support legs by the following equation:

$$F_m = (1+\alpha)F_l + \delta$$

Where $F_m$ is the estimated force from the support legs, $\alpha$ is a scaling error and $\delta$ is an offset error. The method of the preferred embodiment of the present invention allows $\alpha$ and $\delta$ to be calculated and thereby an improved estimate of the environmental force acting on the vessel 1 to be made.

Immediately before the moment of transition between the vessel 1 being supported by the water in which it is located 2 and the vessel 1 being supported by the support legs 3 (i.e. at the position shown in FIG. 3) the vessel 1 will be stationary and the forces from the support legs 3 in each degree of freedom of the vessel will be zero ($F_l=0$). Therefore the environmental forces will be equal and opposite to the forces from the thrusters. This gives a value for the environmental forces immediately before the support legs 3 support the vessel 1. As the environmental forces and the thrust from thrusters is known at that point, by calculating the forces from the support legs 3 as soon as they fully support the vessel 1, an estimate of the offset error ($\delta$) can be made. This estimate is made using a suitable algorithm and filtered versions of the measurement as the vessel 1 transitions from completely floating in the water 2 to being completely supported by the support legs 3.

When the vessel 1 is in the force determination position shown in FIG. 2, which can be either as the vessel 1 is being raised on the support legs 3 from its final draught (the position of FIG. 4) or as the vessel is being lowered back into its final draught from an operating position located above the water 2 on the support legs 3 (the position of FIG. 1), the scaling error may be estimated. This is done by altering the thrust applied to the vessel 1 and monitoring the variation in the estimated force from the support legs 3 as the thrust is monitored. Whilst this is done it is assumed that the environmental forces acting on the vessel 1 are constant.

The force determination position of the vessel 1 shown in FIG. 2 is a position in which the vessel 1 is supported by the support legs 3, the hull of the vessel 1 is positioned in the water 2 and the vessel is a small distance above its final draught. The vessel's final draught being the position the vessel 1 takes in the water 2 when the vessel is completely floating in the water and is unsupported by the support legs 3. Importantly, in the force determination position the environmental forces acting on the vessel 1 are substantially the same as the environmental forces that will act on the vessel when it is in its final draught and vessel's thrusters are located in the water 2. In the force determination position shown in FIG. 2 the vessel 1 is approximately 1 m higher in the water 2 than in the vessel's final draught, which is shown in FIG. 4.

When applying thrust to the vessel 1 in the force determination position, for any given degree of freedom, when the thruster force is varied from an initial force of $F_{t1}$ to a second force of $F_{t2}$ the calculated force from the support legs 3 will vary from an initial force of $F_{m1}$ to a second force of $F_{m2}$. Knowing these four values and an estimate of the offset error allows the scaling error to be calculated using the following equation:

$$\alpha = \frac{\delta - F_{m2}}{F_{t2} - F_{t1} - F_{m1} + \delta} - 1$$

In practice a plurality of filtered values of the force from the thrusters and the calculated forces from the legs are used, rather than simply two values. Furthermore, the estimate is not made once. Instead, the thrust is gradually varied and a least squares regression algorithm is used to give a more accurate estimate of the scaling error.

Once the scaling and offset errors have been accurately estimated an accurate estimate of the environmental forces acting on the vessel 1 can be made. Once this is known a suitable thrust can be applied to the vessel by the dynamic positioning system as the support legs 3 are raised and the vessel transitions to completely floating in the water (as shown in FIG. 4). This may ensure that the vessel 1 does not undergo any significant positional excursions.

What is claimed is:

1. A method of estimating environmental force acting on a supported jack-up vessel comprising the steps of:
    positioning the vessel in a force determination position;
    measuring the strain on at least one support leg of the jack-up vessel when a first thrust is being applied to the vessel;
    applying a second thrust to the vessel after the strain in the at least one support leg is measured;
    varying the second thrust applied while monitoring the variation in the strain in the at least one support leg as the second thrust is varied; and
    calculating an estimate of at least one environmental force from the measured strain in the at least one support leg and the monitored variation in the strain in the at least one support leg as the second thrust is varied whilst the vessel is in the force determination position.

2. The method of claim 1, wherein the second thrust applied to the vessel whilst the vessel is in the force determination position is varied in magnitude and/or direction.

3. The method of claim 2, wherein the second thrust applied to the vessel is varied in a predetermined pattern such that the thrust is varied along each of the surge, sway and heading degrees of freedom of the vessel.

4. The method of claim 2, wherein at least one scaling error between a calculated force from the at least one support leg and the actual force from the at least one support leg is determined from the variation in the monitored variation in the strain in the at least one support leg and the variation in the thrust applied to the vessel.

5. The method of claim 4, wherein the at least one scaling error is calculated using a regression algorithm.

6. The method of claim 5, wherein the scaling error is calculated using a least squares regression algorithm.

7. The method of claim 1, further comprising the initial steps of:
  raising the vessel from an unsupported position wherein the vessel is not supported by its support legs to a position where the vessel is supported by the support legs;
  monitoring the second thrust and the strain in the at least one support leg as the vessel transitions from not being supported by the support legs to being supported by the support legs; and
  determining at least one offset error between the calculated force from the at least one support leg and the actual force from the at least one support leg from the monitored second thrust and strain.

8. The method of claim 1, wherein the environmental force acting on the vessel is estimated with respect to the surge, sway and heading of the vessel.

9. The method of claim 1, wherein the strain is measured in all of the support legs of the jack-up vessel.

10. The method of claim 1, wherein the strain is measured in the at least one support leg by means of a plurality of strain gauges installed on the at least one support leg.

11. The method of claim 10, wherein the plurality of strain gauges comprises a plurality of subsea gauges installed at positions on the at least one support leg that are underwater when the vessel is in the force determination position.

12. The method of claim 10, wherein the plurality of strain gauges comprises a plurality of surface gauges installed at positions on the at least one support leg that are above water when the vessel is in the force determination position.

13. The method of claim 10, wherein the strain gauges are located on chord and/or diagonal brace members of the at least one support leg.

14. A method of maintaining the position of a jack-up vessel as it transitions from being supported by its support legs to being unsupported by its support legs comprising the steps of:
  estimating at least one environmental force acting on the supported jack-up vessel by:
    positioning the vessel in a force determination position;
    measuring the strain on at least one support leg of the jack-up vessel when a first thrust is being applied to the vessel;
    applying a second thrust to the vessel after the strain on the at least one support leg is measured;
    varying the second thrust applied while monitoring the variation in the strain in the at least one support leg as the second thrust is varied; and
    calculating an estimate of at least one environmental force from the measured strain in the at least one support leg and the monitored variation in the strain in the at least one support leg as the second thrust is varied whilst the vessel is in the force determination position;
  applying a suitable thrust to the vessel on the basis of the estimated at least one environmental force in order to maintain the position and orientation of the vessel when the support legs of the jack-up vessel are raised; and
  fully raising the legs of the jack-up vessel.

* * * * *